US000001172H

United States Statutory Invention Registration [19]

[11] Reg. Number: H1172

[43] Published: Apr. 6, 1993

Gorniak

[54] VEHICLE BATTERY JUMPER SYSTEM

[76] Inventor: Allen Gorniak, 4640 Clayton St., Denver, Colo. 80216

[21] Appl. No.: 700,036

[22] Filed: May 7, 1991

Related U.S. Application Data

[63] Continuation of Ser. No. 461,307, Jan. 5, 1990, abandoned.

[51] Int. Cl.[5] ..... H02J 7/34

[52] U.S. Cl. ..... 307/48; 307/66; 290/37 R; 290/50; 320/15

[58] Field of Search ..... 307/46, 64, 66; 320/2, 320/6, 7, 15, 16, 17, 18; 290/38 R, 38 A, 38 B, 38 O, 38 D, 38

[56] References Cited

U.S. PATENT DOCUMENTS

| | | | |
|---|---|---|---|
| 2,692,953 | 10/1954 | Markett Jr. | 290/38 R |
| 2,729,750 | 1/1956 | Draper et al. | 307/66 |
| 3,108,190 | 10/1963 | Gebhard | 307/66 |
| 3,340,402 | 9/1967 | Curtis | 320/15 X |
| 4,009,051 | 2/1977 | Kazis et al. | 320/15 |
| 4,229,687 | 10/1980 | Newman | 320/2 |
| 4,667,140 | 5/1987 | Sweetman | 307/66 X |
| 4,703,191 | 10/1987 | Ferguson | 307/66 X |

*Primary Examiner*—Bernarr E. Gregory
*Attorney, Agent, or Firm*—Terry M. Gernstein

[57] ABSTRACT

A vehicle battery jumper system can be manually activated to start a vehicle in the event the battery associated with that vehicle cannot operate the starter system of the vehicle.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VEHICLE BATTERY JUMPER SYSTEM

This is a continuation of copending application Ser. No. 07/461,307, filed on Jan. 5, 1990, now abandoned.

TECHNICAL FIELD OF THE INVENTION

The present invention relates to the general art of automotive vehicles, and to the particular field of starting systems for automotive vehicles.

BACKGROUND OF THE INVENTION.

Nearly all land vehicles, such as automobiles, are started using a vehicle battery in a starting system. The batteries used in such starting systems are generally re-charged during operation of the vehicle, but are subject to becoming discharged, as when the vehicle light or some battery-operated accessory is left on while the vehicle is not in operation, or not being able to supply adequate power to operate the starting system, as when the battery is near the end of its lifetime, or when the battery and vehicle engine are cold.

In such instances the vehicle battery must be jumped to start the vehicle. Heretofore, such jumping procedure has required connecting the vehicle battery terminal to a terminal of a jumper battery, such as in another vehicle, properly grounding the batteries, and then starting both vehicles in a proper sequence. This procedure may require the driver of the vehicle having the "dead" battery to leave his vehicle and may require two vehicles to be properly aligned to effect the electrical connections.

Thus, at least one person may be required to leave their vehicle and there may be a requirement that two vehicles be parked in a proper orientation. These requirements can be annoying in inclimate weather, and can be dangerous if the vehicles are being jumped next to a busy roadway.

More importantly however, is the danger involved if the jumping procedure is not properly carried out. There is a danger of explosion, fire, or acid burns if the jumper cables are not properly connected.

Therefore, there is a need for a vehicle battery jumping system which does not require a user to leave his vehicle and does not require that user to connect leads to the batteries associated with the jumping procedure during the jumping process.

OBJECTS OF THE INVENTION

It is a main object of the present invention to provide a vehicle battery jumping system which does not require a user to leave his vehicle.

It is another object of the present invention to a vehicle battery jumping system which does not require a user to leave his vehicle and does not require that user to connect leads to the batteries associated with the jumping procedure during the jumping process.

SUMMARY OF THE INVENTION

These, and other, objects are achieved by a vehicle battery jumper system which includes a connection circuit means which is operated from inside the vehicle to connect the vehicle started to a back-up battery.

An automatic system is also included to automatically and reliably activate the jumper system in the event the vehicle battery does not have enough power to operate the overall system. The automatic system also includes a means for operating the back-up battery in place of the vehicle battery.

In this manner, the user does not have to leave his vehicle and effect a jumping procedure in order to jump start the vehicle.

BRIEF DESCRIPTION OF THE DRAWING FIGURES

DETAILED DESCRIPTION OF THE PREFERRED EMBODIMENT OF THE INVENTION

Figure 1:
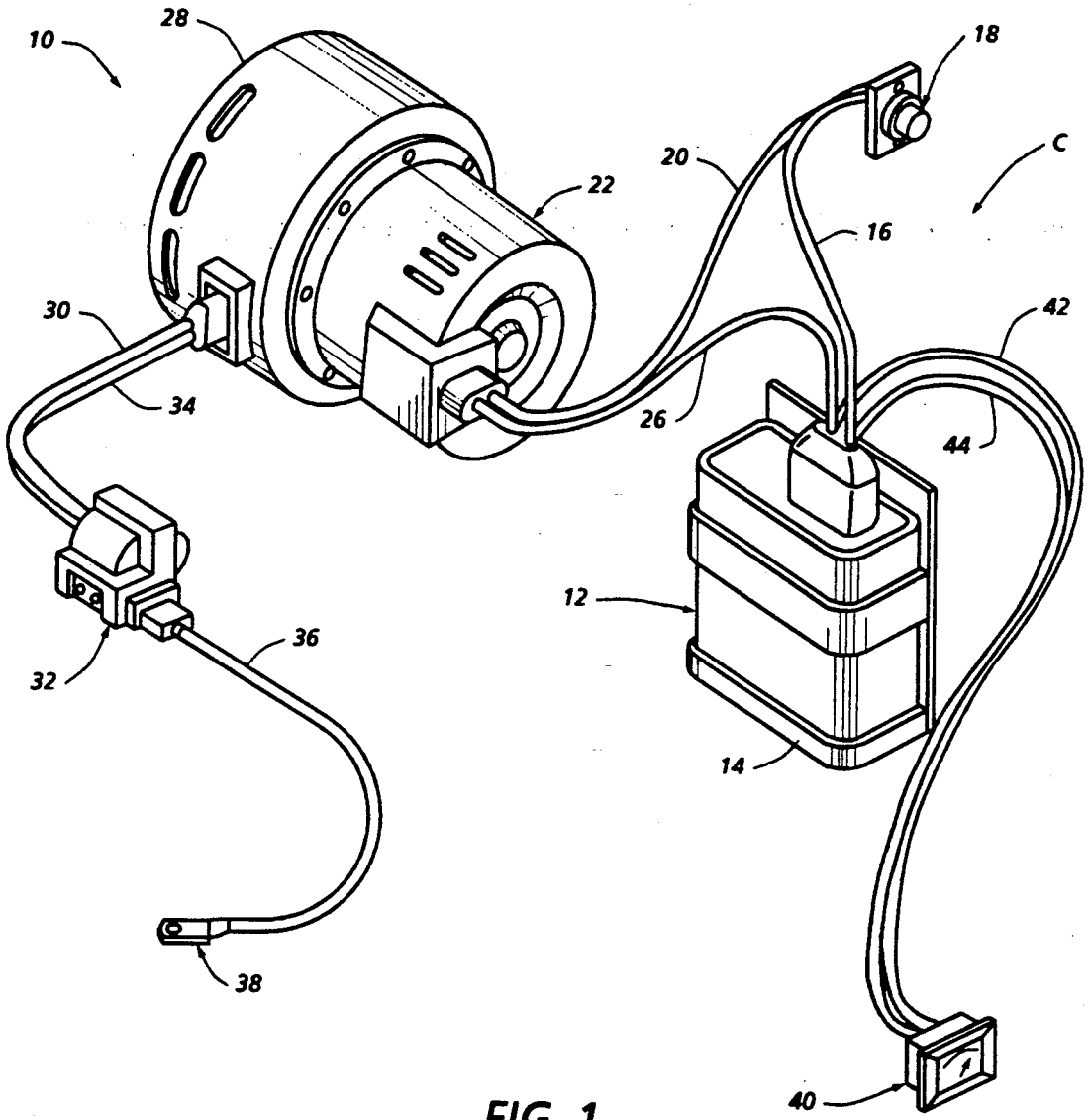
FIG. 1 is a perspective of the various elements included in the vehicle battery jumper system of the present invention.

Shown in FIG. 1 is a vehicle battery jumper system 10 embodying the present invention. The system 10 can be manually activated in the event a vehicle battery does not have sufficient power to operate the vehicle starter. The vehicle driver is not required to leave his vehicle, or to effect the electrical connection required for a proper jump start.

Figure 2:
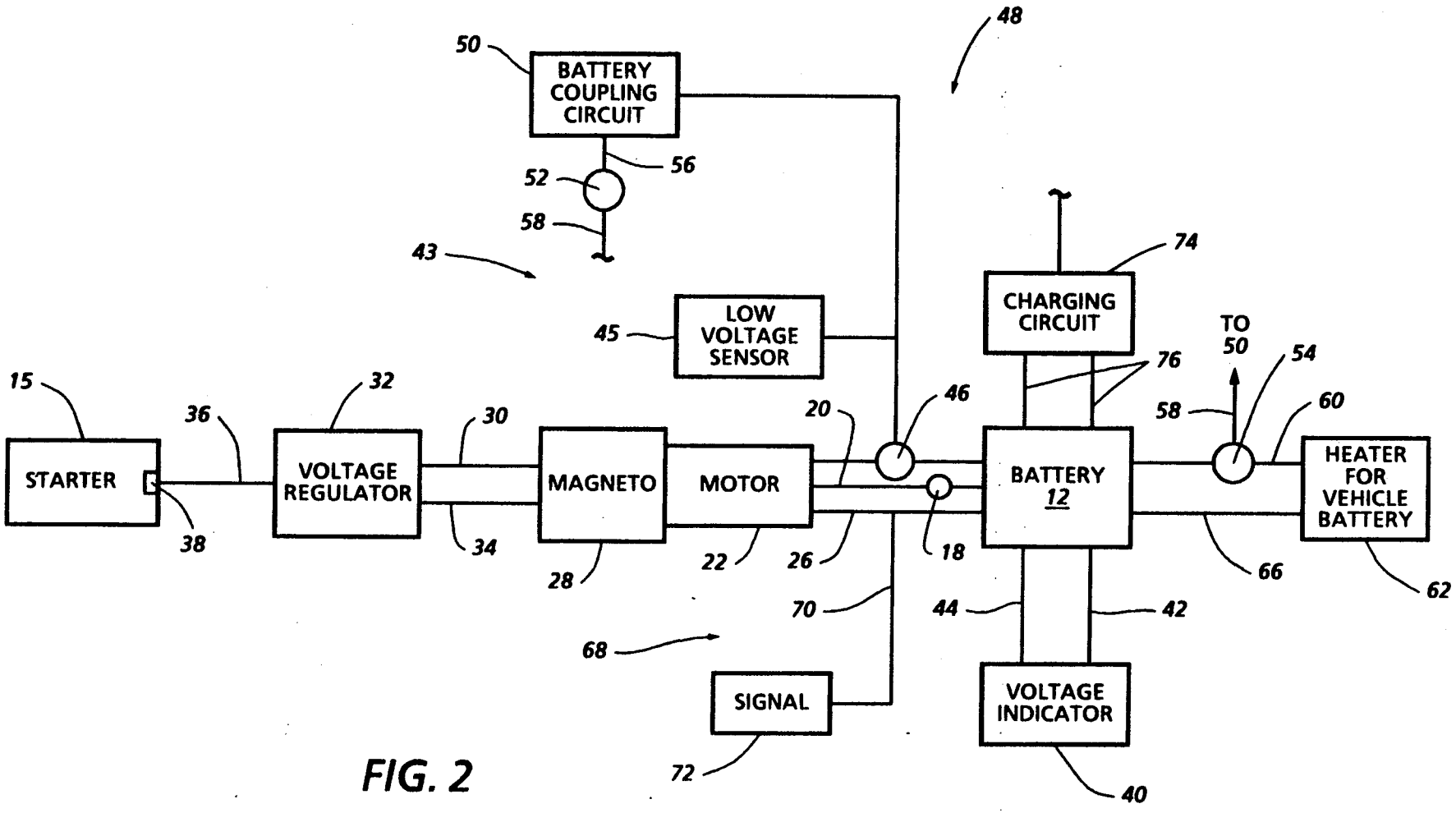
FIG. 2 is a block diagram illustrating the overall jumper system.
Figure 3:
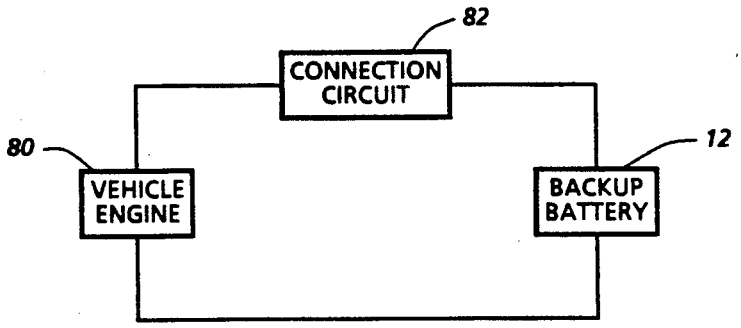
FIG. 3 is a block diagram illustrating a charging circuit used in conjunction with the back-up battery of the present invention.
Figure 4:
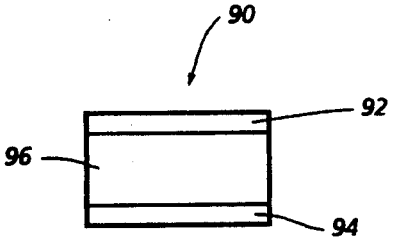
FIG. 4 is a diagram illustrating a charging device associated with the back-up battery charging system.
Figure 5:
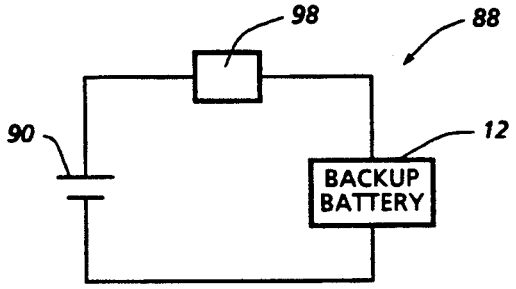
FIG. 5 is a block diagram illustrating a charging circuit used in conjunction with the back-up battery of the present invention.
Figure 6:
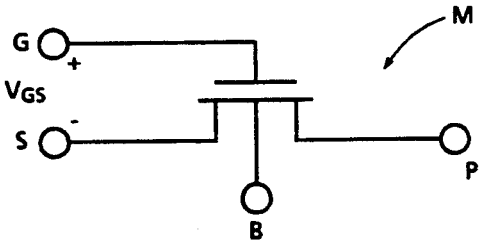
FIG. 6 shows a MOS switch that is used in the jumper system.
Figure 7:
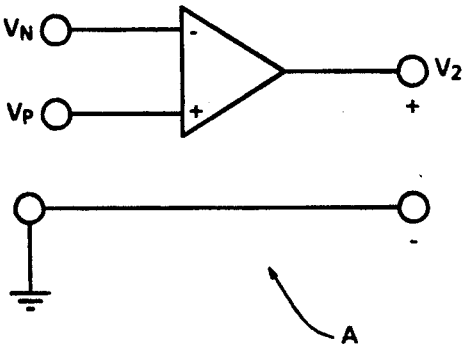
FIG. 7 shows an operational amplifier that is used in the jumper system.

The manually operated system is illustrated in FIG. 1 and includes a back-up battery 12 that is mounted in the engine compartment of the vehicle by a mounting bracket 14. The battery 12 can be re-chargeable. The back-up battery 12 is connected to the vehicle starter 15 (shown in FIG. 2) by a connection circuit C. The connection circuit means includes a line conductor 16 that connects the back-up battery to the manually operated switch 18, such as a simple push button type switch, that is mounted in the passenger compartment of the vehicle, preferably on the dashboard near the driver side of the vehicle.

A line conductor 20 electrically connects the switch to a motor 22 that is also mounted in the vehicle engine compartment so that the switch is in electrical series with the back-up battery and the motor to supply power from the back-up battery to the motor when the switch is closed. A further line conductor 26 electrically connects the motor to the back-up battery to form a complete circuit.

A magneto 28 is connected to the motor to be operated thereby, and a line conductor 30 connects the magneto to a voltage regulator 32, with another line conductor 34 connecting the voltage regulator 32 and the magneto 28 to complete the circuit. A line conductor 36 connects the voltage regulator to a power lead 38 that is electrically connected to the vehicle starter.

A voltage indicator 40 is connected to the back-up battery by line conductors 42 and 44 and is located in the passenger compartment so that the state of the back-up battery can be viewed.

Should the vehicle battery not have sufficient power to operate the vehicle starting system, the vehicle operator needs only to push the switch 18 while operating the starting system in the normal manner. The starter system will be powered by the vehicle jumper system 10 instead of the vehicle battery. Suitable protection circuit elements will be included in the system 10 to prevent improper connection between the back-up battery and the vehicle battery or the like. However, based on the teaching of the present disclosure and in standard textbooks, such as "Encyclopedia of Electronic Circuits" vols. 1 and 2, edited by Rudolf E. Graf and published by Tab Books, Inc., especially chapters 11 and 12 of vol. 1 and chapters 8 and 9 of vol. 2, those skilled in the electrical circuit art will understand what devices will be needed to effect this protection, and thus such elements and circuits will be not discussed herein.

It is understood that while certain forms of the present invention have been illustrated and described herein, it is not to be limited to the specific forms or arrangements of parts described and shown.

I claim:

1. A vehicle battery jumper system comprising:

A) a re-chargeable back-up battery mounted in an engine compartment of a vehicle;

B) a starter system for the vehicle which includes a starter and a vehicle battery connected to said starter to start an engine associated with the vehicle;

C) a connection circuit means for connecting said back-up battery to the starter and which comprises (1) a manual switch connected to said back-up battery and located in a passenger compartment of the vehicle on a dashboard in that passenger compartment, and (2) a motor connected to said manual switch to be connected to said back-up battery when said manual switch is closed.

* * * * *